May 27, 1969 S. E. TOWNSEND 3,447,026
CRT SCAN STABILIZER
Filed Oct. 15, 1965

INVENTOR.
STEPHEN E. TOWNSEND
BY Anthony D. Cennamo
ATTORNEYS

INVENTOR.
STEPHEN E. TOWNSEND
BY Anthony D. Cennamo
ATTORNEYS

INVENTOR.
STEPHEN E. TOWNSEND
BY Anthony D. Cennamo
ATTORNEYS

United States Patent Office 3,447,026

Patented May 27, 1969

3,447,026
CRT SCAN STABILIZER

Stephen E. Townsend, Rochester, N.Y., assignor to Xerox Corporation, Rochester, N.Y., a corporation of New York Filed Oct. 15, 1965, Ser. No. 496,284
Int. Cl. H01j 29/70
U.S. Cl. 315—21 12 Claims

ABSTRACT OF THE DISCLOSURE

Apparatus for stabilizing the scan trace of a CRT flying spot scanner and including a plurality of multi-element, proportioned area, light responsive detector apparatus for developing signals proportional to the horizontal and vertical positional errors of the scan trace relative to a normal position. The geometry and position of each of the detectors is arranged so that the ratio of the width of the impinging trace on one element to the width of the impinging trace on a second element is proportional to the vertical position error of the trace and the error is generated by comparing the output signal produced by the impinging trace on a third element with a reference signal.

This invention relates to graphic communication systems, and more particularly to methods and apparatus for accurately controlling the trace position of CRT scanners or the like.

Graphic communication systems broadly comprise systems concerned with the transmission of images by converting an original multi-dimensional subject into time varying signals corresponding to, for example, density variations along some predetermined scanning raster. Means are provided at the receiving location to reconvert such signals into corresponding density variations along a corresponding scanning raster.

In the conversion of pictures or documents into electrical signals, prior art systems employed mechanical scanning operations whereby a narrow beam of light was traced over an original document and density variations reflected from the original document were converted into electrical signals by, for example, photoelectric means. In some systems the original to be transmitted was mounted on a rotatably supported drum; in other systems the original document was successively advanced past an oscillating scanning means which moved transversely with respect to the sheet whereby successive transverse scanning operations were performed. The corresponding scanning operations at the receiver station are maintained in synchronism with the transmitter scanner thereby generating a facsimile of the original document at the receiver.

A cathode ray tube scanner has been found in the prior art to be particularly useful, especially where the inertia of the moving mechanical scanner imposed an operational limitation. In the cathode ray tube scanner a scanning beam or dot is focused on the original document and the beam is caused to oscillate across the document so as to successively traverse the picture or original document. Light reflected from the document as the spot scans a line of the document falls upon a light sensitive device thus generating electrical signals corresponding to the information content of the original. Line-by-line scanning is achieved by automatically advancing either the documents or the scanner by an amount equal to the width of a scanning line at the end of each scanning operation. Suitable synchronizing pulses are commonly generated at the end of each line scan for initiating a corresponding movement between the marker and record medium at the receiver.

One problem inherent in prior art cathode ray tube-type scanners has been to control the stability of the beam trace position. As is known, any nonlinearity or fluctuations in the CRT beam trace position results in a distortion effect in the electrical signals generated at the transmitter and corresponding discrepancies in the facsimile generated at the receiver in response to such distorted signals. For example, uncorrected discrepancies in the form of the scanning waves used as a time base in the facsimile transmitter and/or in its associated receiver will cause image distortion such as cramping of certain portion of the reconstituted image in relation to other parts.

It is know in the art, to initiate the return stroke of the scaning spot at the end of the line or the end of the complete frame or both by means of a synchronizing signal so that the image synthesized at the receiver will be a more or less accurate reproduction of the image presented to the transmitter pick-up element. Further, it is known to use coarse and fine correction means in conjunction with a conventional dot scanning system to correct for nonlinearities occuring in the trace. These correction schemes generally have employed means for optically comparing the raster pattern formed by the scanning spot on a fluorescent screen with a master pattern.

Such optical comparison techniques have been generally found to be unacceptable because they not only necessitate the use of specially made and accurately positioned mask elements, but they also require elaborate and complex servo-type control apparatus. The servo control apparatus in such mask comparison systems is actuated in proportion to a pulse duration and/or pulse amplitude, wherein the pulse duration and pulse amplitude correspond to error signals derived from the mask type comparison. Further, to convert such pulse duration and/or amplitude signals into horizontal and vertical error signals for correcting the CRT trace position errors generally requires complex electronic circuitry for logically developing an appropriate correction signal.

It is therefore an object of the present invention to simplify the scan stabilization of a CRT flying spot scanner.

It is another object of the present invention to provide an improved, shaped array, light responsive detector apparatus for automatically developing appropriate correction signals in response to unwanted variations in the sweep position of a CRT trace.

It is another object of the present invention to provide improved methods and apparatus for simplifying the accurate positioning of a CRT trace.

It is another object of the present invention to reduce the complexity of electronic control circuitry required to accurately stabilize the scan of a CRT in response to the detection of unwanted variations in the CRT scan positions at the beginning or end of a trace.

It is a further object of the present invention to provide multi-segment, proportioned area detector apparatus for accurately and economically detecting position errors at the beginning and end of a CRT trace and for automatically generating appropriate trace position correction error signals in response thereto.

In accomplishing the above objects and other desirable aspects, applicant has invented a novel, trielement, proportioned area, light responsive detector apparatus. The area and thus the output signal of each of the light responsive elements traversed by an impinging CRT trace is a function of the respective horizontal and vertical position of the trace relative to a normal trace position. The geometry or shape of first and second light responsive elements is designed such that a signal output of each, which is proportional to the area traversed by the impinging trace, is a function of the vertical displacement of the trace relative to a normal position. The shape and position of a third light responsive element is designed such that horizontal positional errors may be detected by comparing the output signal, generated in response to an impinging trace, with a reference signal.

In accordance with the preferred embodiment, one of the trielement detectors is positioned at each end of a CRT trace and the error signals generated by the light responsive elements at either end are applied to the inputs of two pair of differential amplifiers. The respective pairs of differential amplifiers generate appropriate horizontal and vertical deflection error signals proportional to the horizontal and vertical positional errors at the beginning and end of a trace. These error signals are combined with the normal horizontal and vertical deflection signals in the respective sweep generators thereby accurately compensating for any position errors observed in the CRT trace relative to the normal position.

For a more complete understanding of applicant's invention, reference may be had to the following detailed description in conjunction with the drawings in which.

Figure 1:
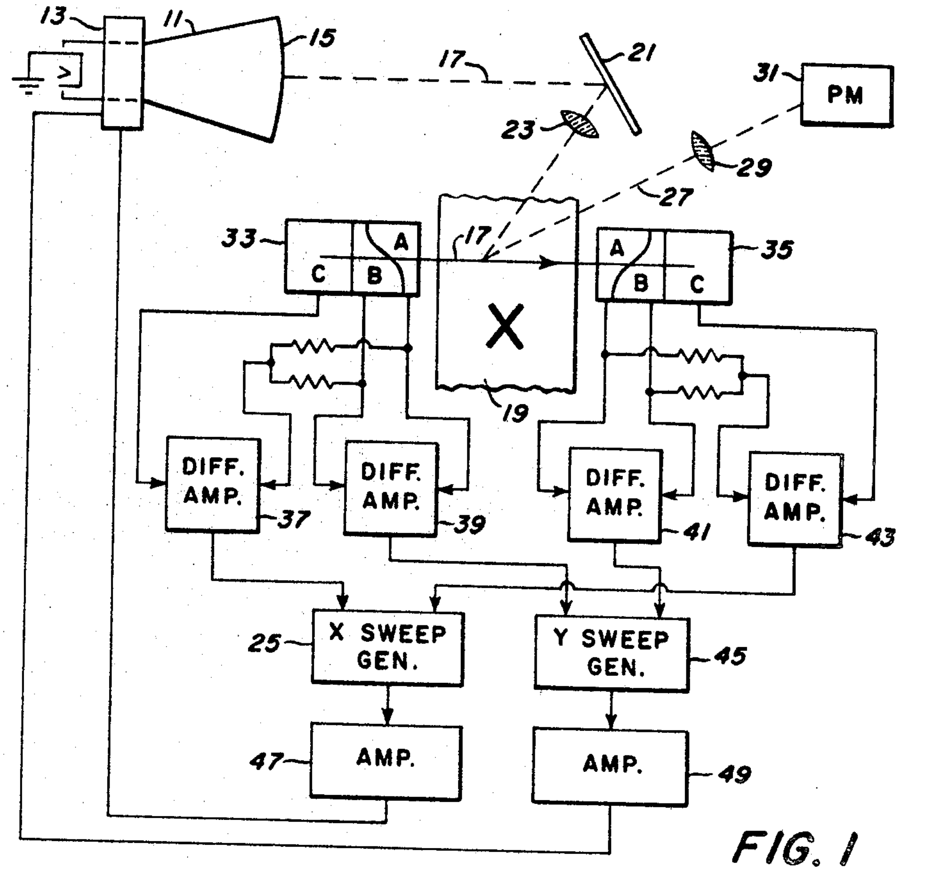
FIG. 1 is a block diagram of a CRT flying spot scanner embodying the principles of applicant's invention.

Referring now to FIG. 1, cathode ray tube 11 represents an image exploring device which is provided with deflecting means 13. The generation and normal deflection of an electron beam are familiar to those skilled in the electronic art and are thus diagrammatically illustrated and need not be further explained. The electron beam generated in CRT 11 produces a spot of light upon a fluorescent screen 15. The light beam 17 generated at the fluorescent screen 15 is used as a scanning light beam and is projected onto an original document 19 by means of mirror 21 and lens 23. As the linear sweep oscillator 25 causes the electron beam to periodically sweep horizontally across the fluorescent screen 15, the scanning spot 17 is caused to periodically traverse the document to be scanned in a raster type sweep. Appropriate signals are generated at the end of each trace to advance the document an incremental amount. Light rays 27 reflected from the document 19 during the raster type scan by light 17, are modulated in accordance with the information contained on document 19. Light rays 27 are focused by lens 29 and fall upon photoelectric cell 31 which generates in response thereto appropriate electrical signals having an instantaneous amplitude corresponding to the intensity variations of the light reflected on the original document during scan. This part of the system is quite conventional.

The scan stabilization or position correcting apparatus in accordance with applicant's invention comprises a pair of multielement light responsive detectors juxtapositioned with an on opposite edges of the document to be scanned. The detectors are arranged to be traversed by the image exploring light beam. The respective outputs of light responsive detectors 33 and 35 are coupled to the inputs of two pair of differential amplifiers 37, 39 and 41, 43. The outputs of the corresponding differential amplifiers of the two pair are coupled to the X and Y or horizontal and vertical sweep generators 25 and 45. The outputs of the respective sweep generators 25 and 45 are coupled by appropriate amplifiers 47 and 49 to the coils of deflection means 13.

As shown, the light responsive detectors 33 and 35 comprise similar first, second and third shaped light responsive areas denominated A, B, and C. Light responsive detectors 33 and 35 are shown positioned in line on opposite sides of the document to be scanned, however other positions, for example, underneath the document or proximate a beam splitting prism could be used. In the normal position, trace 17 traverses a path beginning in the center of element C of detector 33 and, assuming a left to right trace, sequentially traverses elements B and A of detector 33, document 19, elements A and B, and terminates in the center element C of detector 35. The segments of detectors 33 and 35 traversed by image exploring beam 17 are, as hereinabove explained, light responsive and thus the output signal developed by each detector element is proportional to the total light energy of the impinging beam trace. Thus the output signal of each light responsive segment is proportional to the length of the line, i.e., area, scanned by the image exploring beam. By positioning a pair of multielement light responsive detectors, one at either end of the trace, a horizontal and vertical error signal is developed corresponding to the positioned error at the beginning and end of each image exploring trace. The signals emanating from the respective light responsive elements are coupled to the differential amplifiers and, as will be hereinafter more fully explained, appropriate horizontal and vertical error signals are developed.

Figure 2:
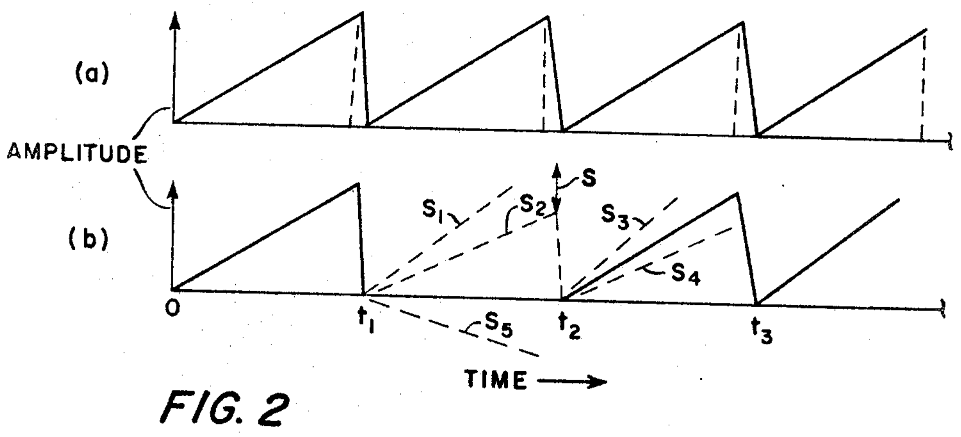
FIG. 2A is a characteristic curve of a linear sweep oscillator.
FIG. 2B is a characteristic curve of a linear sweep oscillator with selective portions thereof modified.

The respective horizontal and vertical error signal generated at the beginning and end of each trace are coupled to the respective horizontal and vertical sweep generators 25 and 45. In response to the error signals, which may result, for example from the variations in line voltage, and/or other circuit parameters of the sweep circuitry, appropriate corrected waveforms are generated by the sweep generators and applied by the respective amplifiers 47 and 49 to the deflection means 13. As shown in FIG. 2A, the output of the horizontal or X sweep generator comprises periodic linearly rising ramp waveform. As shown in FIG. 2B with no horizontal positional error detected, the linear ramp is unaltered. In response to the generation of a horizontal positioning errors either in slope and/or the relative magnitude of the linear portion of the sweep may be altered in a number of ways. As shown in dotted lines $S_1$, $S_2$, $S_3$ and $S_4$ during the time intervals $t_1$, to $t_2$ and $t_2$ to and $t_3$ such control may be effected by shifting the relative magnitude of the beginning and end points of the trace. Line S illustrates a representative variation in the end point of the trace and a similar variation may be generated in the beginning point in response to detected error at the beginning of a sweep. Similarly, in response to the detection of a vertical error at the beginning and/or end of the trace, the beginning and end points may be shifted. As illustrated by $S_5$ the shift in response to vertical errors may be negative as well as positive and thus a ramp shaped waveform proportional to the error will be applied to the deflection yoke to compensate for the detected vertical errors.

Figure 3:
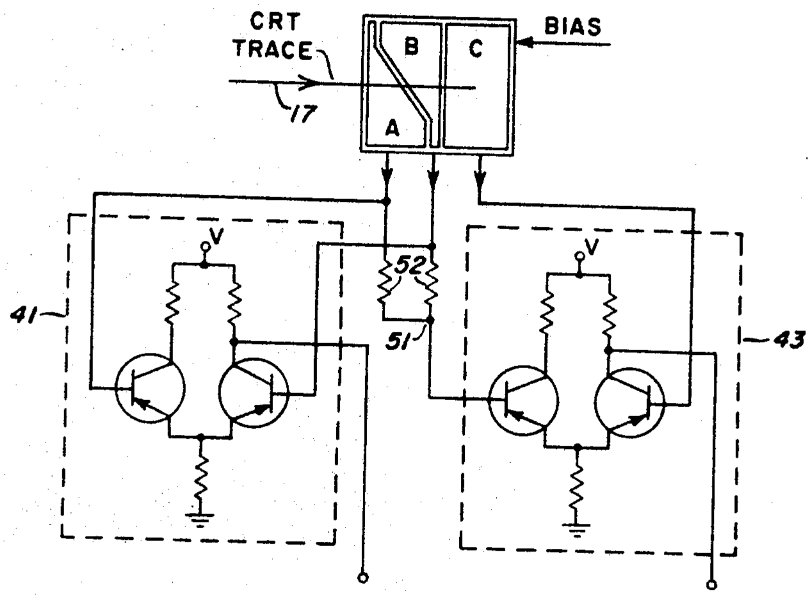
FIG. 3 is an enlarged view of a multielement, proportioned area light responsive detector apparatus in accordance with one aspect of applicant's invention.
Figures 4A, 4B:
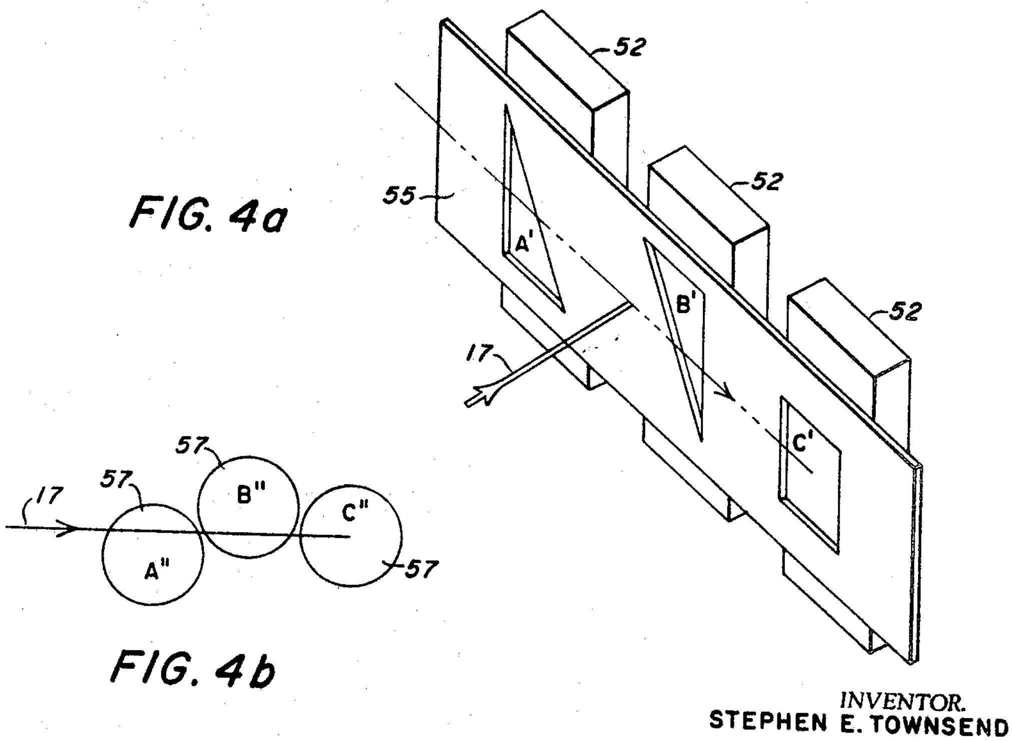
FIGS. 4A and 4B show other embodiments of multielement proportioned area light responsive detectors apparatus in accordance with other aspects of applicant's invention.

Referring now to FIG. 3 and FIGS. 4A and 4B various embodiments of applicant's multi-segment, proportional area light responsive detector apparatus will be explained. As hereinabove stated, it is desirable in accordance with the principles of applicant's invention to develop a horizontal and vertical error signal at the beginning and end of each sweep trace. As shown in FIG. 3, the light responsive segmented detector apparatus comprises a first, second, and third light responsive section denominated A, B and C. The configurations of cell A and cell B are so proportioned and arranged that the ratio of the trace line length, i.e., area illuminated, of one cell traversed by the impinging scan to the line length, i.e., are illuminated, of the other cell is a function of the vertical position of the scan. If the scan is properly positioned, an equal line length and therefore equal area of each cell will be illuminated during the CRT trace. Thus, with the scan in the normal vertical position, the respective signals emanating from the light responsive sections A and B will be substantially equal and therefore the output from terminal 42 of different amplifier 41 will correspond to a zero error signal. Correspondingly in the presence of a vertical error, i.e., a tilt condition or a vertical displacement of the trace, the line length and thus the area illuminated by an impinging trace in the respective A and B sections will be unequal. These unequal signals developed by sections A and B will generate an error signal at terminal 42 of differential amplifier 41 proportioned to the vertical position error.

Horizontal errors are detected by comparing the output signals of segment C in the presence of an impinging trace with a reference standard. The dimension of cell C are designed to facilitate the detection of horizontal error, i.e., either a centering or line length error, by comparing a signal emanating from cell C with the composite signals emanating from cells A and B. The composite signal at junction 51 of summing resistors 52 is merely illustrative and any reference standard, for example, a reference voltage source could be used. However, to insure that the error detection apparatus is insensitive to brightness variations, it is preferable to use the composite A and B signal or a reference standard which is sensitive to the brightness of the trace. As shown, the line length of the CRT trace impinging on cell C in the normal scan position is equal to the sum of the line length impinging on cells A and B. Thus a horizontal error signal is developed whenever signals emanating from cell C which are applied to one input of a differential amplifier 43, do not correspond with the other input of the differential amplifier which represents a sum of the signals emanating from A and B. Conversely, when the input signals to amplifier 43 from section C and A and B do correspond, a no error signal is developed.

FIGS. 4A and 4B illustrate alternative embodiments which may be employed in practicing applicant's invention. In FIG. 4A, substantially rectangular photocells 53 are positioned behind a selectively apertured mask member 55. The shape of the respective apertures in mask 55 are designed to expose proportional areas of the respective light sensitive cells such that an error signal proportional to the position of the trace are generated in a manner similar to that hereinabove set forth. As shown the apertures comprise a pair of oppositely disposed triangular apertures for exposing areas A′ and B′ and a rectangular aperature for exposing area C′ in the respective photoconductors 52. FIG. 4B illustrates a light detector in accordance with another embodiment of applicant's invention which may be fabricated by positioning a plurality of substantially circular-shaped light detectors 57 in a clustered, off-line array.

In operation, a sweep position correction apparatus embodying the light detectors illustrated in FIGS. 4A and 4B in accordance with the principles of applicant's invention comprises a servo type control loop which would function in a manner hereinabove set forth with respect to FIG. 1. The vertical position of the CRT trace would be properly maintained by positioning the trace such that the signals developed in sections A and B of the respective detectors 33 and 35 are equal. Similarly, the horizontal position of the scan would be properly maintained by positioning the trace such that the error signals from segments A, B and C of the respective detectors 33 and 35 are related by the equation $A+B/2=C$. This latter condition is predicated upon the assumption that the trace in the normal position would begin and terminate in the middle of area C of the respective detector. However, as hereinabove stated, other horizontal stabilizing criteria may be utilized by properly designing a reference level with respect to the normal signal from the C sections of the detectors with the trace properly positioned.

The above description of the position correction detectors with reference to FIGS. 3, 4A and 4B has assumed that the response time of the photoconductors is much less than the sweep time. If this were not the case, additional capacitance could be added across the photoconductor detectors to delay or retard the development of the error signals.

Figures 5, 6, 7:
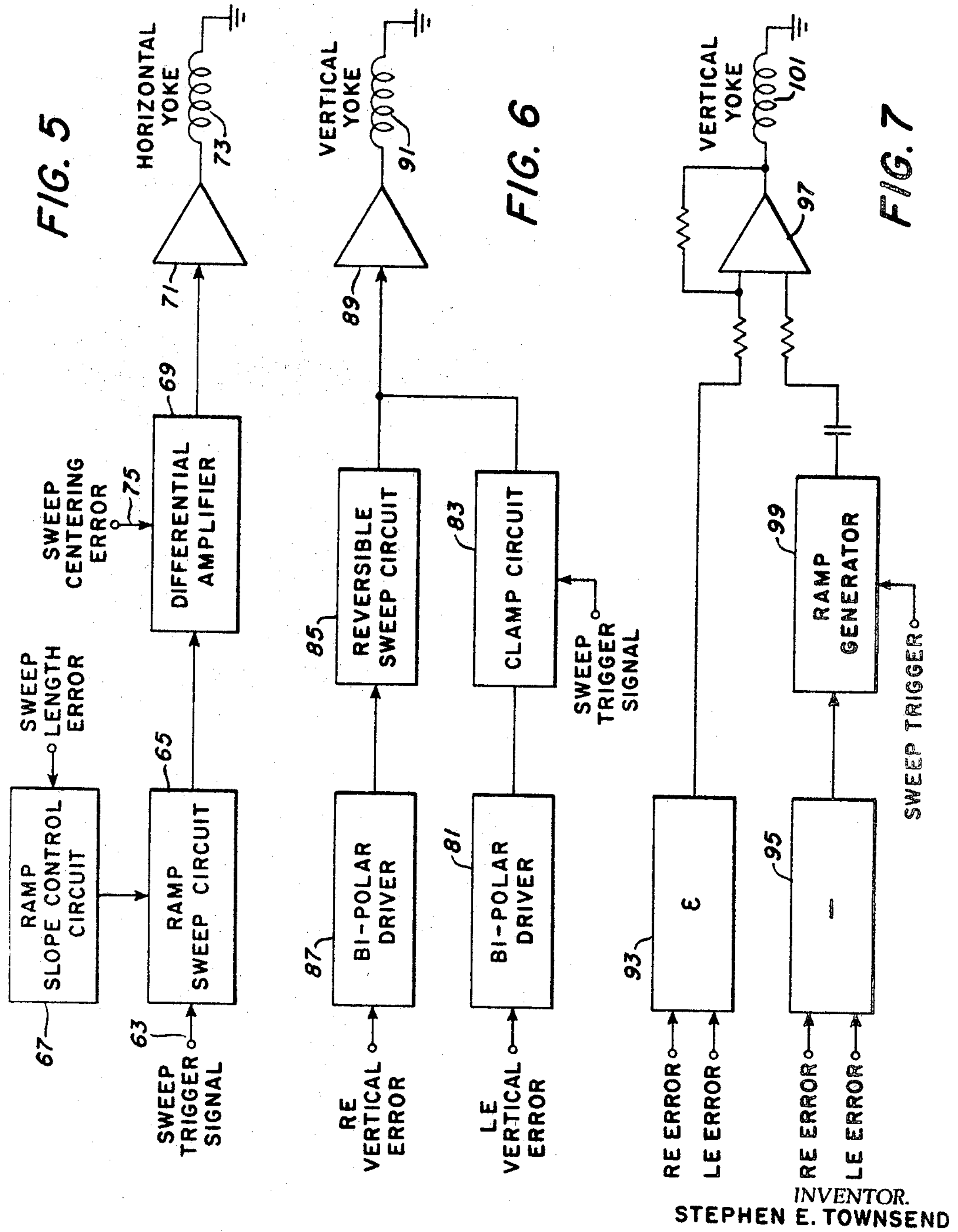
FIG. 5 is a block diagram of a horizontal deflection amplifier compatible with the principles of applicant's invention.
FIG. 6 is a block diagram of a vertical deflection amplifier compatible with the principles of applicant's invention.
FIG. 7 is a block diagram of another embodiment of a vertical deflection amplifier compatible with the principles of applicant's invention.

Referring now to FIG. 5 there is shown a block diagram of circuitry for modifying the horizontal deflection sweep in accordance with signal errors from applicant's trielement detector. An input or trigger pulse is applied to terminal means 63 to selectively control the operation of a ramp sweep circuit 65. The ramp sweep circuit 65 may comprise a timing capacitor selectively coupled to a constant current source by a transistor switch. In response to the sweep trigger signal, the transistor switch would reset the timing capacitor to a reference level, for example ground, and thereafter allow the capacitor to charge at a fixed rate. In the absence of a sweep length error which, assuming a left-to-right scan as shown in FIG. 1, comprises an error signal emanating from differential amplifier 37, ramp slope control circuit 67 would not modify the predetermined charging rate of the ramp sweep circuit 65 and therefore a normal, linearly increasing ramp waveform would be applied to differential amplifier 69. In the absence of a sweep centering error which, assuming the left-to-right sweep, comprises an error signal emanating from differential amplifier 43 at the end of the trace, the ramp waveform emanating from ramp sweep circuit 65 would be applied unaltered to amplifier 71. The output of amplifier is coupled to the horizontal deflection yoke 73 for deflecting the beam trace in the normal manner. In the trielement position correcting apparatus detected a sweep length error, i.e., if the sweep did not begin in the center of segment C of the left-hand detector apparatus, as shown in FIG. 1, an appropriate signal would be developed in differential amplifier 37 and this voltage would be applied to the ramp slope control circuit 67. In response to this error signal, the charging rate of ramp sweep circuit 65 would be modified to compensate for the detected error. The output waveform of ramp sweep circuit 65 would be modified in response thereto to compensate for the detected error. The output waveform of ramp sweep circuit 65 modified, for example that shown in FIG. 2B between times $t_2$ and $t_3$ as A would then be applied to the differential amplifier 69 and coupled to the horizontal yoke to correct the sweep length error.

In the event that the trielement correction apparatus detected a sweep centering error, i.e., if the trace did not terminate in the center of segment C of detector 35, an appropriate signal would be generated by differential amplifier 43 and applied to the sweep centering error terminal 75 of differential amplifier 69. In response to the detection of a sweep centering error, the output of the differential amplifier 69 would shift the base line of the ramp shaped voltage waveform, either positively or negatively, to compensate for the detected centering error. The differential amplifier 69 may comprise, for example a single stage transistor amplifier in which the ramp shaped timing waveform is applied to the base and in which the sweep centering error is applied through a switching transistor to an intermediate point in a voltage divider network in the emitter circuit. Alternately, amplifier 69 may comprise any of the commercially available operational amplifiers. In operation the waveform appearing across a resistor in the collector circuit of the single transistor differential amplifier would be shifted on a voltage scale by an amount proportional to the sweep centering error.

The block diagram illustrated in FIG. 6 shows a circuit for implementing the vertical error correction in accordance with the principles of applicant's invention. As is known in the art, in the absence of a detected vertical error no correction signal would be applied to the vertical yoke to alter the position of the sweep as determined by the operation of a sweep vertical positioning control. In response to the detection of a vertical error at the start of the sweep, a signal is developed at the output of differential amplifier 39 as shown in FIG. 1. This error signal, designated the start or left end (LE) vertical error signal, is applied to the input of a bipolar driver circuit 81. Bipolar driver circuit 81 may comprise, for example a pair of complementary transistors connected across an appropriate sources of bipolar bias. The error signal would be applied through a time delay circuit, for example, an integrator, to the base of the respective transistors, and the output of the transistor rendered conductive by the error signal would be coupled to a reversible clamp circuit 83. Clamp circuit 83 may comprise a pair of complementary transistors connected across an appropriate source of bias with the emitters, i.e., low output impedance, of the respective transistors coupled to one side of a timing capacitor of reversible sweep circuit 85. In response to a sweep trigger signal, clamp circuit 83 would initially charge the timing capacitor of reversible sweep circuit 85 to a level proportional to the detected error signal. Thereafter, the capacitor of the reversible sweep circuit 85 would be charged through for example, a pair of opposite conductivity transistors coupled across an appropriate source of bias which are responsive to the output signal bipolar driver circuit 87. The input to bipolar drive circuit 87 is generated by the error signal detected at the end of a sweep. Thus, the charging rate of the initially clamped capacitor is determined by the end of trace vertical error signal. The ramp shaped waveform developed in reversible sweep circuit 85 is coupled to amplifier 89 which has its output coupled to the vertical deflection yoke 91. Thus, in accordance with this first embodiment the two ends of the vertical trace are fixed. The beginning position of a trace is fixed by the action of the start or LE vertical error signal which establishes the initial charge on a timing capacitor in the vertical deflection generator. Similarly, the end position of the trace is fixed by the action of the end or RE error signal, which determines the charging rate of the timing capacitor in the vertical deflection generator circuit. The modified ramp-shaped correction waveform coupled to deflection yoke 91 is thus designed to compensate for errors effecting the end points of the vertical sweep thereby stabilizing the vertical position of the trace.

Another embodiment of a vertical deflection generator which may be employed to develop a correction waveform in response to detected vertical errors is shown in FIG. 7. A vertical error signal is developed at the beginning and end of a trace in a manner hereinabove set forth in conjunction with FIG. 1 and denominated RE and LE for right-hand and left-hand errors, respectively. These error signals are applied as inputs to a summing amplifier 93 and a difference amplifier 95. The output of the summing amplifier is applied as one input to an operational amplifier 97. The output of the difference amplifier 95 is applied to control the slope of a ramp generator 99 in a manner similar to that hereinabove described in conjunction with FIG. 5. The output of ramp generator 99 in response to a sweep trigger signal is capacitively coupled to the other input of the operational amplifier 97. The output of the operational amplifier 97 is coupled to one end of vertical deflection yoke 101 and thus, the sum of the error signals developed at the beginning and end of a trace are used to establish the D.C. level of the input of the operational amplifier and the difference of the error signals developed in the respective ends of the trace are used to modify a ramp generator, in this manner the output of the operational amplifier generates a ramp shaped waveform for correcting tilt or vertical displacement in the vertical deflection system.

In the foregoing description there is disclosed a scan stabilization or correction apparatus comprising a plurality of shaped, multielement light responsive detectors positioned at the beginning and end of a trace sweep for developing appropriate position error signals. These error signals are applied to the horizontal and vertical deflection amplifiers in the servo-type loop to accurately compensate for position errors of a CRT trace. The invention has been described in terms of various specific embodiments for accurately positioning a CRT trace, however these specific embodiments are to be understood as illustrative only. Further, the particular sets of signals described above are obviously not unique nor are any of the particular embodiments of the circuitry, amplifiers, or pulse shaped circuits intended in any way to be limiting. Many modifications will suggest themselves to those skilled in the art in practicing the principles of applicant's invention without departing from the spirit of the disclosed invention. Therefore, the foregoing description and drawings are to be understood to be illustrative only and the invention is to be interpreted broadly in terms of basic concepts. It is accordingly applicant's intention to be limited only as indicated by the scope of the appended claims.

What is claimed is:

1. In a cathode ray tube flying spot image scanner including means for generating an electron beam and means for deflecting said beam on the face of a fluorescent screen at a predetermined rate and additionally including light responsive pickup means responsive to signals reflected from a document during a raster type scan for developing electrical signals corresponding to the information bearing light density variations reflected from said scanned document, the improvement comprising:

scan control apparatus including first and second multielement, proportioned area light responsive detector means and wherein said detector means comprises a trielement array aligned in the direction of scan wherein the area of two elements illuminated when traversed by an impinging CRT trace is a function of the vertical displacement of the trace and wherein the area of a third element illuminated when traversed by an impinging CRT trace is a function of the horizontal position of said trace with respect to a normal position of said trace, said detector means being positioned on opposite edges of said scanned document for developing horizontal and vertical position error signals in response to the impingement of said trace on said detector means during the scan, and first and second electric circuit means responsive to said trace position error signals for altering the normal deflection waveforms of said scanner, thereby compensating for deviations from a normal trace position.

2. The improvement defined in claim 1 wherein the trielement array includes two similarly shaped elements and wherein the illuminated areas of each of the elements of the trielement array denominated A, B, and C are related during a CRT trace by the expressions:

$$A=B$$

and $$A+B/2=C$$

when the trace is vertically and horizontally aligned respectively.

3. The improvement defined in claim 2 wherein said trielement array includes a pair of oppositely directed substantially triangular shaped photoconductive elements and a substantially rectangular shaped photoconductive element in juxtaposition with one of said pair.

4. The improvement defined in claim 2 in which said trielement array comprises three elongated spaced apart photoconductive slab members and apertured mask means positioned in front of said photoconductive members in the direction of the impinging beam for selectively exposing predetermined shaped areas of each of said photoconductive slabs to said impinging beam trace.

5. The improvement defined in claim 1 wherein said trielement array comprises three similarly shaped photoconductors arranged in a staggered off center array about the normal center line of the trace.

6. Apparatus for accurately controlling the beam trace positioned in an electronic image scanner comprising a cathode ray tube having a fluorescent screen, means for generating an electron beam, means including a horizontal and vertical ramp sweep circuit for periodically deflecting said beam on the face of said screen for generating a moving scanning point of light, means for projecting said moving scanning point of light transversely across a document to be scanned in a raster type sweep, means for advancing said document to be scanned between successive ones of said raster type sweeps, first multielement position error detecting means positioned proximate the beginning of said sweep for detecting horizontal and vertical position errors and for generating individual error signals proportional to detected horizontal and vertical position deviations from a normal position, second multielement positional error detecting means positioned proximate the end of said sweep for detecting horizontal and vertical position errors and for generating individual error signals proportional to detected horizontal and vertical position deviations errors from a normal position, means responsive to horizontal error signals emanating from said first detecting means for altering the charging rate of said horizontal deflection ramp sweep circuit, means responsive to said horizontal error signals emanating from said second detecting means for shifting the reference of said ramp sweep circuit to correct for positional errors, means responsive to vertical error signals emanating from said first detecting means for establishing an initial voltage for the ramp shaped wave of said vertical ramp sweep circuit, and means responsive to vertical error signals emanating from said second detecting means for controlling the charging rate of said vertical ramp sweep circuit whereby detected positional errors in the trace are compensated and the trace position is maintained in its normal sweep position.

7. Detector apparatus for determining position errors of an impinging trace of ray energy relative to a normal position, said apparatus comprising first, second and third proportioned area, ray energy responsive detectors, wherein said first and second detectors include a pair of substantially equal area, triangularly shaped detector surfaces said triangular surfaces being substantially parallel, and oppositely directed in a plane normal to the impinging trace and wherein said third detector includes a substantially rectangular detector surface equal in area to the combined area of said triangular sections and substantially parallel thereto, and frame means for supporting said detectors in a predetermined, substantially in-line array.

8. The apparatus defined in claim 7 wherein said detectors comprise a pair of triangular shaped photocells and a rectangular shaped photocell respectively and additionally including circuit means responsive to signals generated in the respective detectors for generating error signals proportional to the horizontal and vertical displacement errors of said impinging trace.

9. The apparatus defined in claim 7 wherein said detectors comprise three spaced-apart photoconductive members and apertured mask means, spaced-apart from and in front of said members in the direction of an impinging trace, for exposing said triangular and rectangular areas of said members respectively, and additionally including circuit means responsive to signals generated in the respective detectors for generating error signals proportional to the horizontal and vertical displacement errors of said impinging trace.

10. Apparatus for detecting one dimensional positional errors of a trace of impinging ray energy and for generating control signals proportional to trace position errors relative to a normal trace position, said apparatus comprising;

a first ray responsive element, said element having a predetermined surface area adapted for exposure to said ray energy, said surface having at least one tapered dimension in a direction substantially mutually perpendicular to said direction of impinging ray energy and to the trace or sweep direction thereof, a second similarly shaped ray responsive element having an area substantially equal to said first element, said second element having its similarly configured tapered dimension oppositely directed in a plane parallel with the surface of said first element, and circuit means responsive to error signals emanating from said elements in response to an impinging trace for generating said control signals.

11. Apparatus for detecting multi-dimensional positional errors of a trace of impinging ray energy and for generating control signals proportional to detected positional errors relative to a normal trace position, said apparatus comprising;

first ray responsive means for generating a first position sensitive signal in response to impinging ray energy, said first means having a predetermined surface area adapted for exposure to said ray energy, said surface including at least one tapered dimension oriented in a direction mutually perpendicular to the direction of said impinging ray energy and to its trace or sweep direction, second ray responsive means for generating a second position sensitive signal in response to impinging ray energy, said second means having a surface area adapted for exposure to said ray energy, said surface of said second means being similarly shaped and substantially equal in area to said surface of said first means, said second surface having its tapered dimension oppositely directed with respect to the surface of said first means in a plane parallel with the surface of said first means, third ray responsive means for generating a third position sensitive signal in response to impinging ray energy, said third means having a surface adapted for exposure to said ray energy, said surface of said third means being substantially equal to the sum of the areas of said first and second means, means for supporting said ray responsive means in an in-line array, and circuit means for generating control signals in response to said position sensitive signals emanating from said ray responsive means.

12. Scan control apparatus for accurately controlling the beam trace position in the cathode ray tube comprising first and second multisection proportioned area light responsive detectors, one of said detectors being positioned proximate the respective end positions of said beam trace, amplifier means comprising four differential operational amplifiers and additionally including first means for individually coupling signals emanating from separate sections from a first group of like shaped sections as one input to each of the first pair of differential amplifiers, second means for individually coupling signals emanating from separate sections of a second group of like shaped sections as the other input to each of said first pair of differential amplifiers and third means for individually coupling the signals emanating from said separate sections of a third group of like shaped sections as one input to each of a second pair of said differential amplifiers, said amplifier means being responsive to signals developed by predetermined sections of said detectors for developing signals proportional to the deviation of said beam from a normal position, first and second deflection means for controlling the normal horizontal and vertical position of said beam, and circuit means responsive to said amplifier means for modifying the operation of said deflection means to compensate for detected errors in said beam position thereby accurately repositioning said beam.

References Cited

UNITED STATES PATENTS

| | | | |
|---|---|---|---|
| 2,855,540 | 10/1958 | Hoover et al. | 315—21 X |
| 2,903,598 | 9/1959 | Hoover | 250—217 |
| 2,904,721 | 9/1959 | Ault | 315—21 X |
| 2,916,660 | 12/1959 | Ketchledge | 315—21 X |
| 2,977,499 | 3/1961 | Brockemuehl | 250—217 |
| 3,188,477 | 6/1965 | Ault | 250—217 |
| 3,317,713 | 5/1967 | Wallace. | |

RODNEY D. BENNETT, Jr., *Primary Examiner.*

BRIAN L. RIBANDO, *Assistant Examiner.*

U.S. Cl. X.R.

250—217